3,136,762
3-LOWER-ALKYLTHIOPHENOTHIAZINES AND METHOD OF PRODUCING THE SAME
Joseph H. Mayer, New York, N.Y., and Joseph Levy, Paramus, N.J., assignors, by mesne assignments, to Universal Oil Products Company, Des Plaines, Ill., a corporation of Delaware
No Drawing. Filed June 1, 1961, Ser. No. 114,040
4 Claims. (Cl. 260—243)

This invention relates to 3-lower-alkylthiophenothiazines and to methods of producing the same. The invention is directed particularly to 3-methylthiophenothiazine having the following structural formula

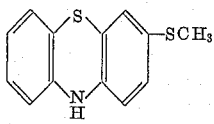

The 2-lower-alkylthiophenothiazines are well known and are used as intermediates in the preparation of tranquilizer type drugs. However, the methods employed in producing the 2-lower-alkylthiophenothiazines require multi-stage procedures which are time consuming and expensive. Thus, for example, 2-methylthiophenothiazine may be synthesized by a series of reactions starting with nitrobenzene. This is converted to meta-thioanisidine in four steps by chlorsulfonation, reduction to m-nitrothiophenol, methylation to the thioether and then reduction of the nitro group. The meta-thioanisidine thus produced is then further converted to 3-methylthiodiphenylamine and the latter finally cyclized with sulfur to give the desired 2-methylthiophenothiazine along with the 4-isomer.

The 3-lower-alkylthiophenothiazine compounds apparently have never been produced heretofore. It has been found that they can be produced by commencing with p-nitrochlorobenzene and converting it to p-nitrothiophenol, after which the process may be continued by following a multi-stage procedure similar to that described above. The 3-lower-alkylthiophenothiazines also may be used as intermediates in producing medicinally valuable products. However, it has been discovered that the latter compounds can be produced by a very much simpler and more economical procedure involving direct reaction between phenothiazine and a lower dialkyl disulfide in the presence of a Friedel-Crafts catalyst.

Accordingly, the principal object of the present invention is to provide novel methods for producing 3-lower-alkylthiophenothiazines.

A further object of the invention is to provide new compounds adapted for use in producing drug products and consisting of the 3-lower-alkylthiophenothiazines.

A specific object of the invention is to produce 3-methylthiophenothiazine.

These and other objects and features of the present invention will appear from the following description thereof wherein reference is made to typical compounds and procedures for the purpose of indicating the nature of the invention but without limiting the invention thereby.

In accordance with the present invention, the 3-lower-alkylthiophenothiazines are prepared in a single operation using relatively inexpensive materials so as to provide a highly economical process for preparing the new compounds. Thus, a dialkyl disulfide is mixed with phenothiazine and a Friedel-Crafts catalyst, and the reaction is completed by heating the mixture whereupon 3-lower-alkylthiophenothiazine is produced and can be separated from the reaction mixture.

The dialkyl disulfides which may be employed are dimethyl disulfide, diethyl disulfide, dipropyl disulfide, diisopropyl disulfide and dibutyl disulfide. The dialkyl disulfide should be employed in at least equi-molar proportions with respect to the phenothiazine. However, an excess of the dialkyl disulfide up to about 5 molar proportions is frequently employed so that it also serves as a solvent or diluent and thereby facilitates stirring and handling of the reaction mixture. In the alternative or in addition, it is possible to use an inert, non-aromatic solvent such as tetrachlorethane, carbon disulfide, or a saturated aliphatic hydrocarbon such as pentane, hexane, cyclohexane and the like, if desired.

The Friedel-Crafts catalyst used may be aluminum chloride, ferric chloride, aluminum bromide, zinc chloride, tin tetrachloride, antimony pentachloride, boron trifluoride or the like. However, it is generally preferable to employ aluminum chloride. The amount of the catalyst used in carrying out the reaction should be at least a molar quantity based on the amount of phenothiazine employed but best results are obtained when using twice the molar amount. Larger amounts of the catalyst up to about four moles may be used but are not required.

In order to illustrate typical practice in carrying out the present invention, the following example is cited.

*Example 1*

80 gms. phenothiazine were admixed with 100 gms. dimethyl disulfide and 112 gms. aluminum chloride were added with stirring during one-half hour. The temperature gradually rose to about 45° C. and the mixture was then heated on the steam bath for about five hours. The gases produced as the reaction proceeded were allowed to escape and their evolution subsided after about three hours. The reaction mixture was then cooled to about 25° C., 400 gms. toluene were added, and the reaction complex decomposed by the gradual addition of 500 gms. 1% hydrochloric acid with stirring and cooling. It was then heated to reflux for one-half hour and the oil layer separated and washed with 500 gms. hot 10% salt solution. Upon cooling the product crystallized from the toluene solution and was filtered and recrystallized from 500 gms. isopropanol. There were obtained 62 gms. 3-methylthiophenothiazine (63% yield) melting at 149–152° C. Further crystallization raised the melting point to 151–152.6° C.

In general, when other lower-dialkyl disulfides are substituted for the dimethyl disulfide in the foregoing example, the reaction conditions may be essentially the same. The reaction proceeds readily at room temperature during its initial stages but preferably is completed by heating to about 100° C. or up to refluxing temperature.

It is generally preferable to add the Friedel-Crafts catalyst gradually to the reaction mixture in order to control the reaction more effectively. However, the conditions of the reaction can be varied considerably and temperatures from about 0° C. to refluxing temperature may be employed. The duration of the treatment also may be varied from about 2 to 10 hours and it is not necessary to add the catalyst gradually.

It will, therefore, be apparent that the reaction conditions as well as the proportions of the reactants employed may be altered considerably in carrying out the reaction. Accordingly, it should be understood that the particular example cited above is intended to be illustrative only and is not intended to limit the scope of the invention.

We claim:
1. The method of producing a 3-lower-alkylthiophenothiazine which comprises the step of heating a mixture containing a lower dialkyl disulfide and phenothiazine in the presence of a Friedel-Crafts catalyst to a temperature not exceeding the refluxing temperature of the mixture.

2. The method of producing a 3-lower-alkylthiophenothiazine which comprises the step of mixing from about 1 to 3 moles of a lower dialkyl disulfide with one mole of phenothiazine in the presence of from about 1 to 4 moles of a Friedel-Crafts catalyst, and maintaining the mixture at a temperature between about 0° C. and refluxing temperature for a period of from 2 to 10 hours.

3. The method of producing a 3-lower-alkylthiophenothiazine which comprises the step of mixing from about 1 to 3 moles of a lower dialkyl disulfide with one mole of phenothiazine in the presence of from about 1 to 4 moles of aluminum chloride, and maintaining the mixture at a temperature between about 0° C. and refluxing temperature for a period of from 2 to 10 hours.

4. The method of producing 3-methylthiophenothiazine which comprises the steps of mixing from 1 to 5 moles of dimethyl disulfide with phenothiazine, adding from 1 to 2 moles of aluminum chloride gradually to the mixture, raising the temperature to about 100° C., and maintaining such temperature for a period of about 5 hours.

References Cited in the file of this patent

UNITED STATES PATENTS 3,000,886     Edgerton et al.     Sept. 19, 1961

FOREIGN PATENTS 802,726     Great Britain     Oct. 8, 1958

OTHER REFERENCES

Bourquin et al.: Helv. Chim. Acta., vol. 41, pages 1061–8 (1958).

Behringer et al.: Angew. Chem., vol. 72, pages 348 to 349 (1960).